United States Patent [19]

Otani et al.

[11] Patent Number: 5,073,906
[45] Date of Patent: Dec. 17, 1991

[54] SYNCHRONIZATION WORD DETECTION APPARATUS

[75] Inventors: Susumu Otani; Syouji Endo, both of Tokyo, Japan

[73] Assignee: NEC Corporation, Japan

[21] Appl. No.: 624,201

[22] Filed: Dec. 6, 1990

[30] Foreign Application Priority Data

Dec. 7, 1989 [JP] Japan .................. 1-319182

[51] Int. Cl.$^5$ .............................. H04L 7/04
[52] U.S. Cl. ................. 375/116; 364/715.11; 364/724.11
[58] Field of Search ............... 375/96, 113, 114, 116; 370/105.4; 364/715.11, 724.11, 724.12, 728.06

[56] References Cited

U.S. PATENT DOCUMENTS

| 3,303,335 | 2/1967 | Pryor | 364/724.12 |
| 4,001,693 | 1/1977 | Stackhouse et al. | 375/116 |
| 4,633,426 | 12/1986 | Venier | 364/724.11 |
| 4,847,877 | 7/1989 | Besseyre | 364/715.11 |

FOREIGN PATENT DOCUMENTS 62-38049 12/1985 Japan .

OTHER PUBLICATIONS

William W. Wu, "Elements of Digital Satellite Communication", vol. I, Computer Science Press, Inc. (1984) 5.9-5.10.

Primary Examiner—Benedict V. Safourek
Attorney, Agent, or Firm—Ostrolenk, Faber, Gerb & Soffen Ostrolenk, Faber, Gerb & Soffen

[57] ABSTRACT

A synchronization (sync) word detection apparatus which, on receiving a signal in which a sync word having a predetermined length (N) is inserted beforehand, detects the sync word out of a demodulated and soft-decided sequence of the received signal. A cross correlator (4) calculates a cross correlation value of the soft-decided and demodulated sequence fed thereto and the sync word. A threshold generating section (1, 2, 3) determines a means power of the demodulated and soft-decided sequence and generates a threshold value on the basis of the mean power. A comparing circuit (5) produces a detection signal when the cross correlation exceeds the threshold value. The apparatus reduces the false detection probability and misdetection prbability even when the receive field intensity sharply changes on a transmission path.

2 Claims, 2 Drawing Sheets

SYNCHRONIZATION WORD DETECTION APPARATUS

BACKGROUND OF THE INVENTION

The present invention relates to an apparatus for detecting synchronization (sync) words out of a received signal and, more particularly, to a sync word detection apparatus applicable to a mobile satellite communication system for detecting sync words out of a demodulated signal produced by demodulating a digital signal sequence in which a sync word having a predetermined length has been inserted by a transmitting station.

While a mobile satellite communication system offers a broad service area and a broad channel band, it suffers from fluctuations in the intensity of received field ascribable to multi-path fading and from so-called shadowing occurring when a mobile station gets behind a building or similar ostacle. Especially, shadowing causes the intensity of received field to sharply change and cannot be sufficiently compensated for even when an automatic gain control circuit is used.

In a system using voice activation method, for example, sync words indicative of the beginning and end of a voice signal are added to the leading and trailing ends of a digitized voice signal. The voice signal with such sync words are modulated and then transmitted to a receive station. The sync words allow the receive station to detect the beginning and end of the voice signal. However, when the receive station fails to detect the sync words due to shadowing or similar cause, it cannot reproduce the voice signal sequence at all.

A system of the type causing a transmit station to insert a sync word in data has a drawback that when a receive station fails to detect a sync word, data that follows the non-detected sync word are lost. Obviously, therefore, the detection of sync words is a prerequisite even with a mobile satellite communication system in detecting data sent from a transmit station.

In a mobile satellite communication system as well as other systems, it is a common practice to detect a sync word out of a signal received from a satellite by detecting a correlation. Specifically, the degree of coincidence of a demodulated signal undergone hard decision and a sync word is calculated, and it is determined that a sync word has been detected if the number of non-coincidences is smaller than a predetermined number ($\epsilon$). For details of circuitry for so detecting a sync word, a reference may be made to William W Wu "Elements of Digital Satellite Communication", COMPUTER SCIENCE, 1984, pp. 342-348.

Misdetection probability $P_{miss}$ and false detection probability $P_f$ are the important criteria for the evaluation of a sync word detection system. Misdetection probability $P_{miss}$ is the probability that the system fails to detect a sync word despite the arrival thereof due to more than $\epsilon$ non-coincidences. The probability $P_{miss}$ is expressed as:

$$p_{miss} = \sum_{i=e+i}^{N} {}^{N}C_i \, p^i (1-p)^{N-i} \quad (1)$$

where p is the bit error rate on the transmission path, and N is the length of a sync word.

On the other hand, when only noise is received in a no-signal condition due to the decrease in the intensity of received field, the result of hard decision may happen to be less than $\epsilon$ non-coincidences. Then, the probability that the individual bits of the hard decision result on a demodulated signal coincide with the individual bits of a sync word is $\frac{1}{2}$. Hence, false detection probability, $P_f$, i.e., the probability that the system determines that a sync word exists is produced by:

$$p_f = \sum_{i=0}^{\epsilon} {}^{N}C_i \left(\frac{1}{2}\right)^{N} \quad (2)$$

As the equations (1) and (2) indicate, to reduce the probabilities $P_{miss}$ and $P_f$, the length N of a sync word has to be increased. Increasing the length N, however, would obstruct the efficient use of transmission path.

In the light of the above, there has been proposed a method which determines a correlation value between a demodulated signal undergone soft decision and a sync word pattern and detects a sync word by seeing if the correlation value is greater than a predetermined threshold value. This kind of method is disclosed in, for example, Japanese Patent Laid-Open Publication No. 38049/1987. A problem with this method is that when the demodulated signal subjected to soft decision diminishes due to a sharp fall of the received field intensity, the correlation value itself decreases despite the reception of a sync word. Once the correlation value decreases below the threshold value, the sync word cannot be detected. Since the fall of received field intensity due to shadowing or similar cause cannot be sufficiently compensated for even with an automatic gain control circuit, an acceptable countermeasure against the above problem is not attainable.

SUMMARY OF THE INVENTION

It is therefore an object of the present invention to provide a sync word detection apparatus capable of detecting a sync word stably even out of a signal sent over a transmission path whose field intensity is apt to sharply decrease as in a mobile satellite communication system, without resorting to sync words having a greater length N.

In accordance with the present invention, a sync word detection apparatus which, on receiving a signal in which a sync word having a predetermined length is inserted beforehand, detects the sync word out of a demodulated and soft-decided sequence of the received signal. A cross correlator calculates a cross correlation value of the demodulated and soft-decided sequence fed thereto and the sync word. A threshold generating section determines a mean power of the demodulated and soft-decided sequence and generates the threshold value on the basis of the mean power. A comparing circuit produces a detection signal when the cross correlation value exceeds the threshold. The apparatus reduces the false detection probability and misdetection probability even when the receive field intensity sharply changes on a transmission path.

BRIEF DESCRIPTION OF THE DRAWINGS

The above and other objects, features and advantages of the present invention will become more apparent from the following detailed description taken with the accompanying drawing in which.

DESCRIPTION OF THE PREFERRED EMBODIMENT

Figure 1:
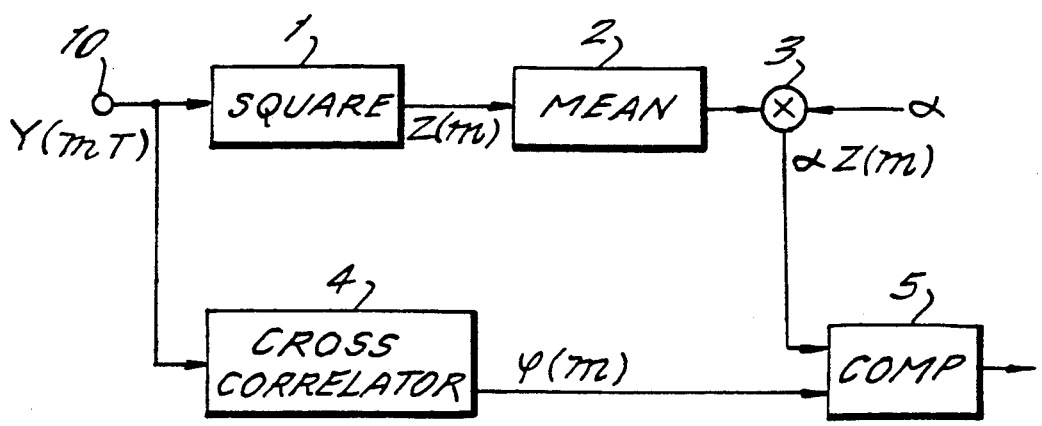
FIG. 1 is a block diagram schematically showing a sync word detection apparatus embodying the present invention.

Referring to FIG. 1 of the drawings, a sync word detection apparatus embodying the present invention is shown. As shown, the apparatus has a square circuit 1, a mean circuit 2, a multiplier 3, a cross correlator 4, and a comparing circuit 5. A result of soft decision is fed from a demodulator, not shown, to the square circuit 1. The mean circuit 2 produces a mean power of N bits of the output of the square circuit 1. The multiplier 3 multiplies the output of the mean circuit 2 by a predetermined constant $\alpha$. The cross correlator 4 produces a cross correlation value of a stored sync word and the result of soft decision. The comparator 5 compares the cross correlation value and the output of the multiplier 3 to produce a sync detection signal.

Specifically, a result of soft decision r(mT) is fed to the square circuit 1 at time mT and cross correlator 4 via an input terminal 10. In response, the square circuit 1 produces $r^2(mT)$. The mean circuit 2 averages the output of the square circuit 1 over a period of N (10, for example) bits of the sync word to determine a mean shift in the N-bit period and thereby a mean power Z(m) of the time-by-time results r(mT) of soft decision, as follows:

$$Z(m) = \frac{1}{N} \sum_{n=0}^{N-1} r^2 (mT + nT)$$

The mean power Z(m) is multiplied by the constant and then fed to the comparing circuit 5 as $\alpha Z(mT)$.

The cross correlator 4 calculates a cross correlation value $\phi(m)$ of the result of soft decision r(mT) and the sync word y(n) (n=0, 1, ..., N−1) by using the following equation:

$$\phi(m) = \frac{1}{N} \sum_{n=0}^{N-1} r(mT + nT) y(n) \quad (3)$$

The cross correlation value $\phi(m)$ is also fed to the comparing circuit 5. The comparing circuit 5 compares $\phi(m)$ with $\alpha Z(m)$ and, if the former is equal to or greater than the latter, produces a sync word detection signal.

Preferably, the constant $\alpha$ is selected to be about 0.5 to 0.7 so that the previously stated probabilities $P_{miss}$ and $P_f$ may have substantially the same value. However, a smaller value may be selected when a smaller probability $P_{miss}$ is desired, while a greater value may be selected when a smaller probability $P_f$ is desired.

The output of the cross correlator 4 decreases with the decrease in the intensity of received field, as stated earlier. Hence, when a fixed threshold is used as in the prior art, a sync word sometimes cannot be detected. By contrast, the illustrative embodiment changes the threshold on the basis of the mean power of the result of soft decision. Hence, the threshold decreases with the decrease in the mean power to reduce the misdetection probability $P_{miss}$ of a sync word. Another drawback with the prior art is that when the soft decision output increases due to the increase in the received field intensity, the cross correlation value increases and is apt to exceed the fixed threshold despite the absence of a sync word, resulting in false detection. The illustrative embodiment increases the threshold in response to an increase in the mean value of the soft decision outputs, thereby reducing the false detection probability $P_f$ also.

Figure 2:
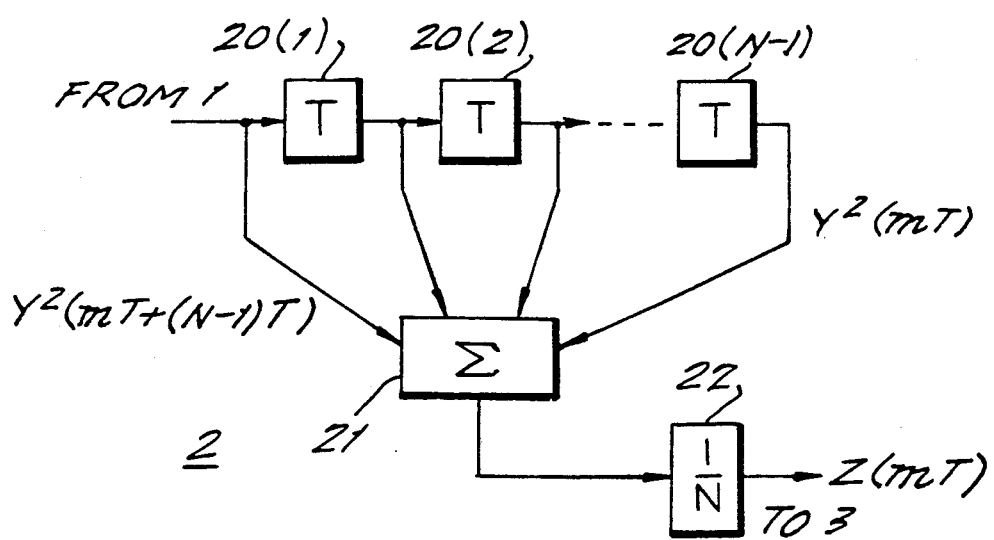
FIG. 2 is a block diagram schematically showing a specific construction of a mean circuit included in the illustrative embodiment.

FIG. 2 shows a specific construction of the mean circuit 2. As shown, the output of the square circuit 1, FIG. 1, is applied to a cascaded array of delay circuit 20(1) to 20(N−1) each delaying an input thereto by one bit of a sync word. The input to the delay circuit 20(1) and the outputs from the delay circuits 20(1) to 20(N−1), i.e., $r^2(mT+(N-1)T)$, ..., $r^2(mT+T)$, $r^2(mT)$ are summed up by an adder 21. The summation output of the adder 21 is divided by N by a divider 22. As a result, a mean power Z(m) associated with the length (N) of a sync word is produced and delivered to the multiplier 3, FIG. 1. Since the divisor N of the divider 22 and the multiplier $\alpha$ of the multiplier 3 both are constants, the divider 22 may be omitted and the multiplier 3 may multiply the input by the constant value which is $\alpha/N$.

Figure 3:
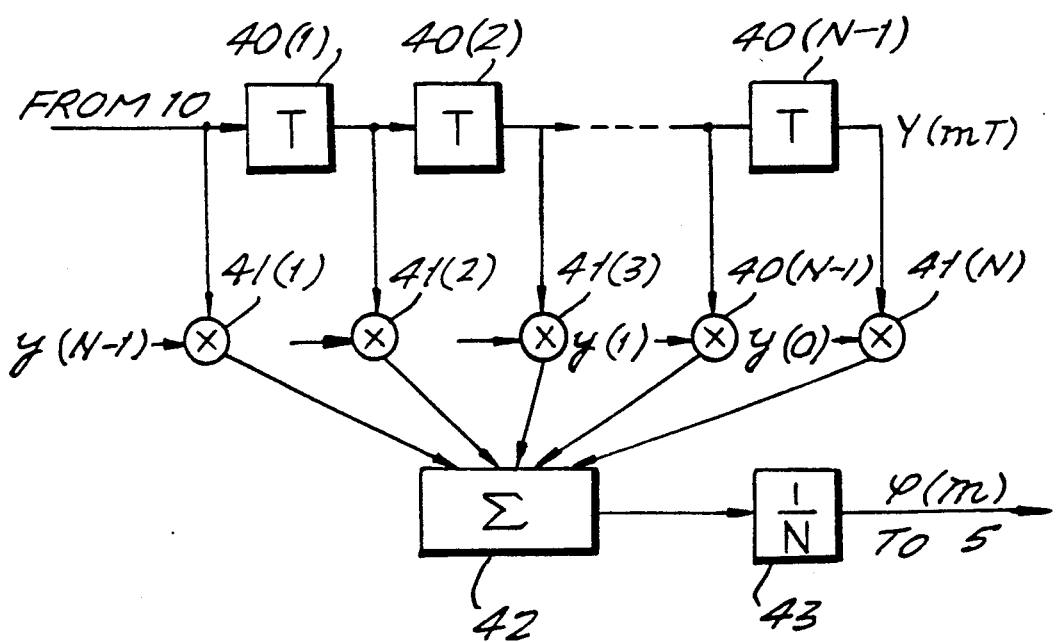
FIG. 3 is a block diagram schematically showing a specific construction of a cross correlator 4 also included in the illustrative embodiment.

FIG. 3 shows a specific construction of the cross correlator 4. As shown, the result of soft decision on the demodulated signal is fed from the input terminal 10, FIG. 1, to a multiplier 41(1) and a cascaded array of delay circuits 40(1) to 40(N−1). As a result, r(mT), r(mT+T), ..., r(mT+(N−1)T) produced by the equation (3) are outputted from the delay circuits 40(N−1), 40(N−2), ..., 40(1) and the input terminal 10, and each is applied to one input of respective one of multipliers 41(N), 41(N−1), ..., 41(1). Applied to the other input are the values y(0), y(1), ..., y(N−1) of the individual bits of the sync word, as shown in FIG. 3. The products from the individual multipliers 41(1) to 41(N) are summed up by an adder 42. A divider 43 divides the summation output of the adder 42 by N, as represented by the equation (3).

It is to be noted that both the divider 22, FIG. 2, and the divider 43, FIG. 3, of the illustrative embodiment may be omitted. Then, the multiplier 3, FIG. 1, will multiply the output of the mean circuit 2 by $\alpha$.

In summary, it will be seen that the present invention provides a sync word detection apparatus which reduces both the misdetection probability and the false detection probability even when the received field intensity is sharply changed, without resorting to longer sync words. These advantages are derived from the unique configuration wherein when a cross correlation between the result of soft decision on a demodulator output and a sync word is determined to detect a sync word, a threshold is produced by use of a mean power in a period corresponding to the length (N) of the sync word.

What is claimed is:

1. A synchronization word detection apparatus for receiving a signal in which a synchronization word having a predetermined length (N) is inserted beforehand and detecting said synchronization word out of a demodulated and soft-decided sequence of said received signal, said apparatus comprising:
   cross correlation calculating means for calculating a cross correlation value of the demodulated and soft-decided sequence fed thereto and a stored synchronization word;
   means for producing a detection signal when the cross correlation exceeds a thershold value; and threshold generating means for determining a mean power of the demodulated and soft-decided sequence and generating said threshold value on the basis of said mean power.

2. An apparatus as claimed in claim 1, wherein said threshold generating means comprises:

means for squaring the demodulated and soft-decided sequence to produce a square;

means for producing a mean power of said squares occurring over an N-bit period; and means for generating said threshold by multiplying said mean power by a predetermined value.

* * * * *